(12) United States Patent
Lee et al.

(10) Patent No.: US 10,057,814 B2
(45) Date of Patent: Aug. 21, 2018

(54) METHODS AND DEVICES FOR ALLOCATING RESOURCES FOR COMMUNICATIONS WITH BASE STATIONS

(71) Applicant: Samsung Electronics Co., Ltd., Suwon-Si, Gyeonggi-Do (KR)

(72) Inventors: Sang-hyun Lee, Hwaseong-si (KR); Sung-jin Kim, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 245 days.

(21) Appl. No.: 13/963,020

(22) Filed: Aug. 9, 2013

(65) Prior Publication Data

US 2014/0269381 A1    Sep. 18, 2014

(30) Foreign Application Priority Data

Mar. 18, 2013  (KR) .................. 10-2013-0028821

(51) Int. Cl.
*H04L 12/26*  (2006.01)
*H04W 28/22*  (2009.01)

(52) U.S. Cl.
CPC .................. *H04W 28/22* (2013.01)

(58) Field of Classification Search
CPC ..... H04W 24/08; H04W 24/10; H04W 24/02; H04W 72/082; H04W 84/12

(Continued)

(56) References Cited

U.S. PATENT DOCUMENTS

| 2004/0190484 A1* | 9/2004 | Shin ................. H04L 1/0002 370/347 |
| 2007/0025301 A1* | 2/2007 | Petersson ............ H04L 47/10 370/338 |

(Continued)

FOREIGN PATENT DOCUMENTS

| KR | 101075621 B1 | 5/2006 |
| KR | 101020141 B1 | 3/2011 |

(Continued)

OTHER PUBLICATIONS

Extended Search Report issued in corresponding European Application No. 13197102.0-1857.

(Continued)

*Primary Examiner* — Andrew Chriss
*Assistant Examiner* — Atique Ahmed
(74) *Attorney, Agent, or Firm* — Harness, Dickey & Pierce, P.L.C.

(57) ABSTRACT

A device may include a receiver configured to receive messages about first transmission rates provided by cooperation devices configured for device-to-device (D2D) communications in a radio communication system supporting the D2D communications; a determiner configured to determine second transmission rates for the device to suggest to the cooperation devices based on the first transmission rates; and/or a transmitter configured to transmit messages about the second transmission rates to the cooperation devices. The determiner may be further configured to change the second transmission rates until the first transmission rates converge. The determiner may be further configured to determine a final transmission rate suggested to the cooperation devices based on the converged first transmission rates.

14 Claims, 6 Drawing Sheets

(58) Field of Classification Search
USPC .................. 455/450; 370/230, 338, 329
See application file for complete search history.

(56) References Cited

U.S. PATENT DOCUMENTS

| | | | | |
|---|---|---|---|---|
| 2007/0127481 | A1* | 6/2007 | Park | H04L 65/4092 370/392 |
| 2009/0016285 | A1* | 1/2009 | Li | H04L 5/0007 370/329 |
| 2010/0041409 | A1* | 2/2010 | Kim | H04L 1/0002 455/450 |
| 2011/0040888 | A1* | 2/2011 | Krishnaswamy | H04L 63/0884 709/231 |
| 2011/0258338 | A1* | 10/2011 | Vass | H04N 7/148 709/233 |
| 2011/0275379 | A1* | 11/2011 | Hakola | H04W 72/042 455/450 |
| 2012/0195250 | A1 | 8/2012 | Jain et al. | |
| 2012/0196608 | A1 | 8/2012 | Ting et al. | |
| 2012/0210401 | A1 | 8/2012 | Pepin et al. | |
| 2013/0195026 | A1* | 8/2013 | Johnsson | H04W 72/0493 370/329 |
| 2014/0153390 | A1* | 6/2014 | Ishii | H04W 76/023 370/230 |

FOREIGN PATENT DOCUMENTS

| | | |
|---|---|---|
| KR | 20110095284 A | 8/2011 |
| KR | 101177165 B1 | 8/2012 |
| WO | WO-2010054474 A1 | 5/2010 |
| WO | WO 2012/159270 | 11/2012 |

OTHER PUBLICATIONS

Device-to-Device (D2D) Communication in MU-MIMO Cellular Networks, James C.F. Li and Feifei Gao, Globecom 2012 (pp. 3583-3587).

* cited by examiner

METHODS AND DEVICES FOR ALLOCATING RESOURCES FOR COMMUNICATIONS WITH BASE STATIONS

CROSS-REFERENCE TO RELATED APPLICATION(S)

This application claims priority from Korean Patent Application No. 10-2013-0028821, filed on Mar. 18, 2013, in the Korean Intellectual Property Office (KIPO), the entire contents of which are incorporated herein by reference.

BACKGROUND

1. Field

Some example embodiments may relate to methods and/or devices for allocating resources for communication with base stations.

2. Description of Related Art

Technologies for increasing a transmission rate while transmitting data from a base station to a device have been studied. The base station and the device may transmit and receive data by using cellular communication. Here, two devices included in a network may pair up to receive split data from the base station. The base station may transmit the split data to each of the two devices by using a multi-input multi-output (MIMO) technology. The two devices transmit and receive the split data via device-to-device (D2D) communications. By using D2D communications, radio resources may be efficiently used between the base station and the devices, and a high transmission rate may be guaranteed.

SUMMARY

Some example embodiments may provide methods and/or devices for allocating resources for communication with base stations.

In some example embodiments, a device may comprise a receiver configured to receive messages about first transmission rates provided by cooperation devices configured for device-to-device (D2D) communications in a radio communication system supporting the D2D communications; a determiner configured to determine second transmission rates for the device to suggest to the cooperation devices based on the first transmission rates; and/or a transmitter configured to transmit messages about the second transmission rates to the cooperation devices. The determiner may be further configured to change the second transmission rates until the first transmission rates converge. The determiner may be further configured to determine a final transmission rate suggested to the cooperation devices based on the converged first transmission rates.

In some example embodiments, the determiner may be further configured to determine a highest transmission rate from among the first transmission rates as the final transmission rate suggested to the cooperation devices.

In some example embodiments, the determiner may be further configured to determine the second transmission rates based on previously determined second transmission rates. The transmitter is further configured to transmit the second transmission rates to the cooperation devices.

In some example embodiments, when the first transmission rates converge, the determiner may be further configured to determine a cooperation device configured to provide a highest transmission rate as a cooperation pair for the D2D communications.

In some example embodiments, the transmitter may be further configured to transmit information about the determined cooperation pair and the final transmission rate to a base station.

In some example embodiments, the receiver may be further configured to receive from a base station a total transmission rate between the base station and cooperation pairs. The total transmission rate may be provided when the device forms the cooperation pairs with the cooperation devices.

In some example embodiments, the determiner may be further configured to determine the second transmission rates within a range of the total transmission rate.

In some example embodiments, the receiver may be further configured to receive the first transmission rates. The determiner may be further configured to determine the second transmission rates based on the first transmission rates and previously determined second transmission rates.

In some example embodiments, the determiner may be further configured to distribute the second transmission rates obtained by excluding the first transmission rates and the previously determined second transmission rates from a total transmission rate between a base station and cooperation pairs, according to a ratio determined with the cooperation devices.

In some example embodiments, a method of allocating resources for communication between a device and a base station in a communication system supporting device-to-device (D2D) communications may comprise determining a cooperation device to form a cooperation pair with another cooperation device from among cooperation devices configured for the D2D communications by exchanging messages about transmission rates provided between the cooperation devices until values of the transmission rates provided between the cooperation devices converge; and/or allocating the resources to the cooperation pair based on values of the converged transmission rates.

In some example embodiments, the determining may comprise determining a cooperation device that provides a highest transmission rate from among the cooperation devices as the cooperation pair.

In some example embodiments, the determining may comprise determining transmission rates suggested by the device to the cooperation devices based on transmission rates provided by the cooperation devices; and/or changing the transmission rates suggested to the cooperation devices until values of the transmission rates suggested to the cooperation devices converge.

In some example embodiments, the allocating may comprise allocating the resources corresponding to the converged transmission rates to the determined cooperation pair.

In some example embodiments, the determining may comprise transmitting and receiving messages about transmission rates suggested by the device to the cooperation devices and transmission rates provided to the cooperation devices.

In some example embodiments, the messages about the transmission rates suggested to the cooperation devices may be determined based on messages about transmission rates provided by the cooperation devices received from the cooperation devices.

In some example embodiments, a device may comprise a receiver configured to receive messages about first transmission rates from cooperation devices configured for device-to-device (D2D) communications in a radio communication system supporting the D2D communications; a determiner configured to determine second transmission rates based on the first transmission rates; and/or a transmitter configured to transmit messages about the second transmission rates to the cooperation devices. The determiner may be further configured to change the second transmission rates until the first transmission rates converge. The determiner may be further configured to determine a final transmission rate based on the converged first transmission rates.

In some example embodiments, the device may be configured to allocate resources based on the converged first transmission rates.

In some example embodiments, the device may be configured to allocate resources based on the final transmission rate.

In some example embodiments, the transmitter may be further configured to transmit information about the final transmission rate to a base station.

In some example embodiments, the determiner may be further configured to determine, when the first transmission rates converge, a highest transmission rate from among the converged first transmission rates as the final transmission rate.

In some example embodiments, the transmitter may be further configured to transmit information about the final transmission rate to the base station.

In some example embodiments, the transmitter may be further configured to transmit information about a determined cooperation pair to the base station.

In some example embodiments, the determiner may be further configured to determine, when the first transmission rates converge, a cooperation device configured to provide a highest transmission rate as a cooperation pair for the D2D communications.

In some example embodiments, the transmitter may be further configured to transmit information about the determined cooperation pair to a base station.

In some example embodiments, the transmitter may be further configured to transmit information about a final transmission rate to the base station.

In some example embodiments, the transmitter may be further configured to transmit information about the determined cooperation pair to a base station. The transmitter may be further configured to transmit information about the final transmission rate to the base station.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION

Figure 1:
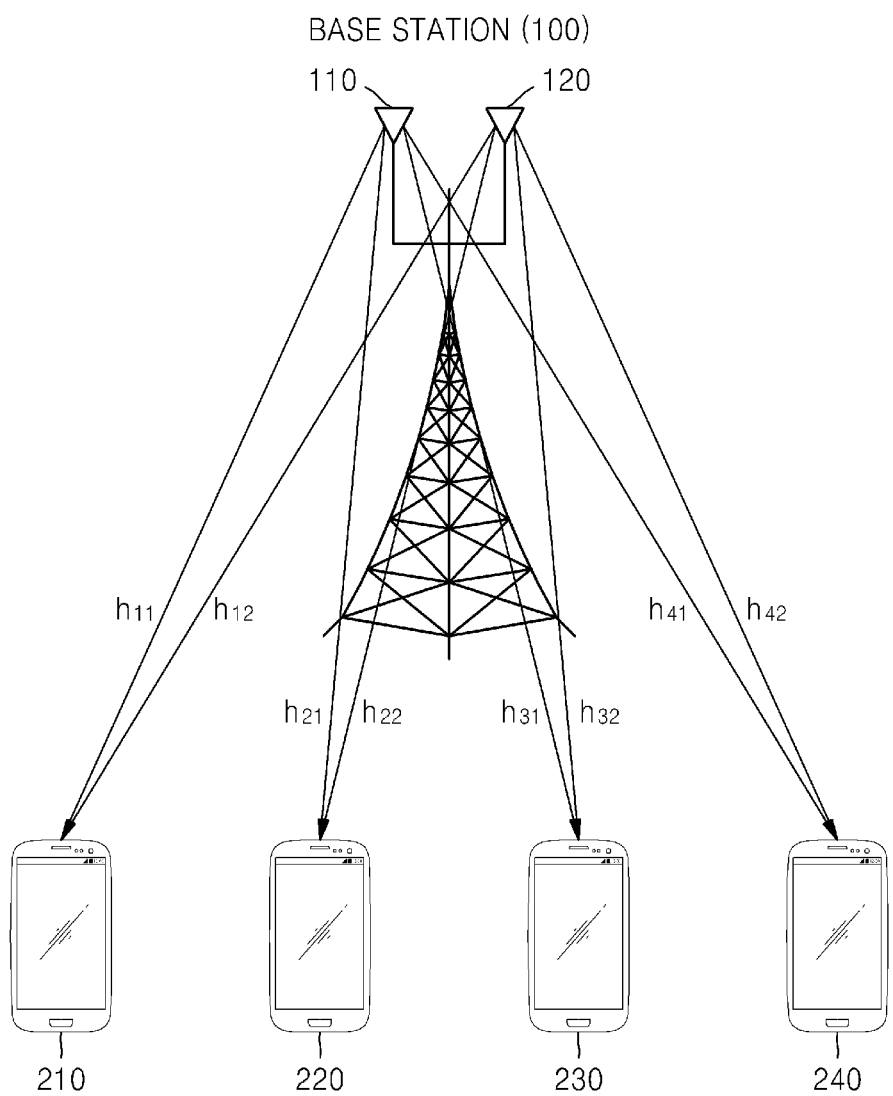
FIG. 1 is a diagram for describing a radio communication system.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will typically have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature, their shapes are not intended to illustrate the actual shape of a region of a device, and their shapes are not intended to limit the scope of the example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is a diagram for describing a radio communication system. Referring to FIG. 1, the radio communication system includes a base station 100 and a plurality of first through fourth devices 210 through 240. In the radio communication system of FIG. 1, data may be transferred not only between the base station 100 and the first through fourth devices 210 through 240, but also between the first through fourth devices 210 through 240.

The base station 100 is radio communication equipment supporting a radio communication service of the first through fourth devices 210 through 240. The base station 100 supports a communication technology, such as code division multiple access (CDMA), global system for mobile communications (GSM), wideband code division multiple access (WCDMA), or long term evolution (LTE) technology. The base station 100 transmits data to the first through fourth devices 210 through 240 by using the communication technology, such as CDMA, GSM, WCDMA, or LTE.

The base station 100 supports MIMO technology. MIMO technology simultaneously transmits split data by using a plurality of antennas. The base station 100 includes a plurality of antennas to transmit split data by using the antennas. The base station 100 transmits the split data to the first through fourth devices 210 through 240 by using different radio resources. For example, the base station 100 may simultaneously transmit the split data in different frequency bands by using the plurality of antennas. In FIG. 1, the base station 100 includes first and second antennas 110 and 120, but the number of antennas included in the base station 100 is not limited to two.

The first through fourth devices 210 through 240 include communication terminals, such as smart phones, tablet personal computers (PCs), or laptops. The first through fourth devices 210 through 240 include any electronic device capable of transmitting and receiving data to and from the base station 100 or an adjacent device wirelessly or via wires.

The first through fourth devices 210 through 240 not only transmit and receive data to and from the base station 100, but also communicate with another device in a network. The first through fourth devices 210 through 240 transmit and receive data to and from the base station 100, and transmit the received data to the other device or receive data from the other device.

The base station 100 may transmit data to the first through fourth devices 210 through 240 via different frequency bands. In FIG. 1, the base station 100 includes the first and second antennas 110 and 120, but the number of antennas included in the base station may be more than two. In FIG. 1, reference characters $h_{ab}$ denotes radio communication between the base station 100 and the first through fourth devices 210 through 240. In $h_{ab}$, 'a' is an index indicating a device and 'b' is an index indicating an antenna of the base station 100. For example, a reference numeral $h_{21}$ denotes radio communication between the second device 220 and the first antenna 110 of the base station 100. The base station 100 communicating with the first through fourth devices 210 through 240 by using the first antenna 110 is denoted by $h_{11}$, $h_{21}$, $h_{31}$, and $h_{41}$. Also, the base station 100 communicating with the first through fourth devices 210 through 240 by using the second antenna 120 is denoted by $h_{12}$, $h_{22}$, $h_{32}$, and $h_{42}$.

Figure 2:
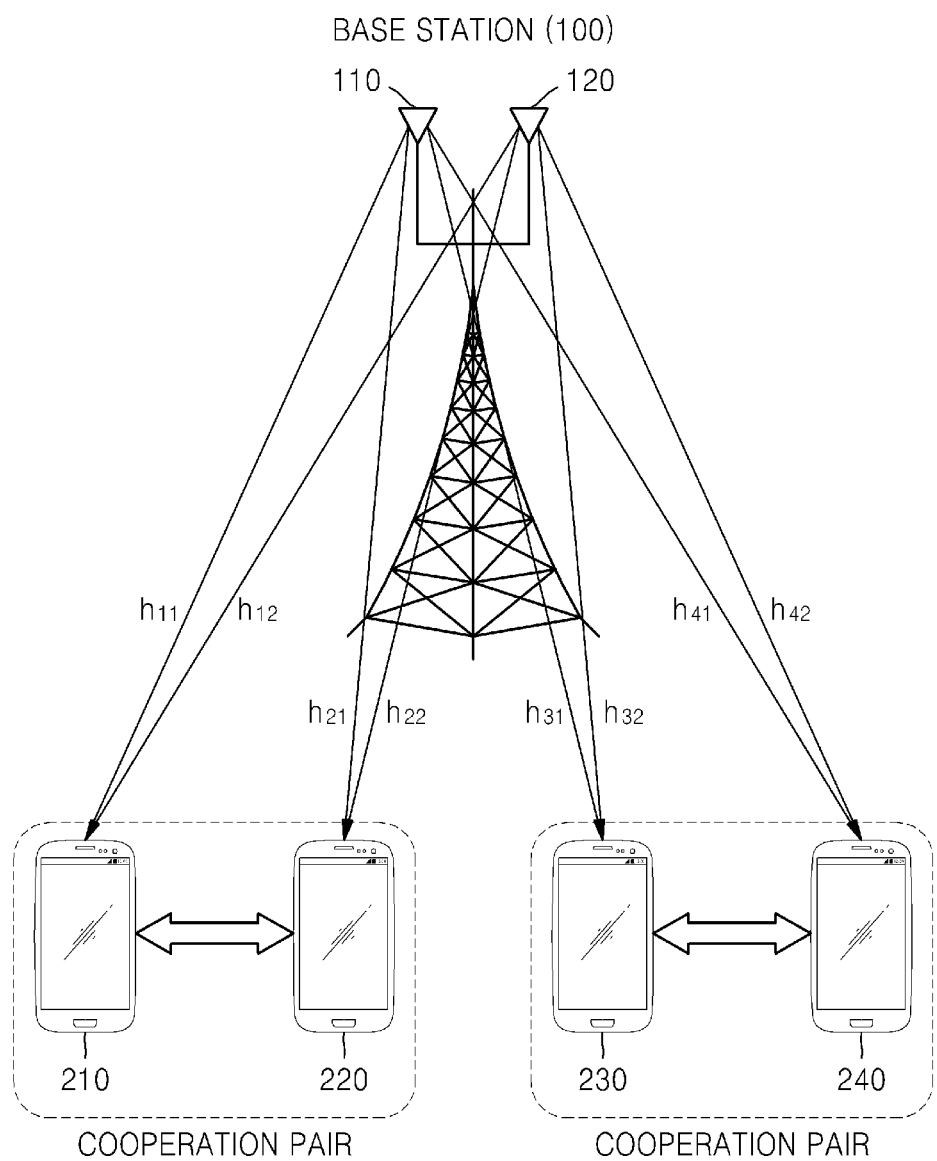
FIG. 2 is a diagram for describing D2D communications.

FIG. 2 is a diagram for describing D2D communications. Referring to FIG. 2, the first and second devices 210 and 220 form a cooperation pair and the third and fourth devices 230 and 240 form a cooperation pair.

The first device 210 forms the cooperation pair with the second device 220 so as to receive data. When the first and second devices 210 and 220 form the cooperation pair, the first and second devices 210 and 220 receive split data from the base station 100. Then, the first and second devices 210 and 220 exchange parts of the received split data. In other words, a part of the split data is transmitted from the base station 100 to the first device 210 and a remaining part of the split data is transmitted to the second device 220. Here, the first and second devices 210 and 220 may receive the split data from the base station 100 by using different frequencies.

The first and second devices 210 and 220 transmit and receive data through the D2D communications. The first and second devices 210 and 220 may transmit and receive data by using wireless fidelity (WiFi), Bluetooth, or near field communication (NFC).

Figure 3:
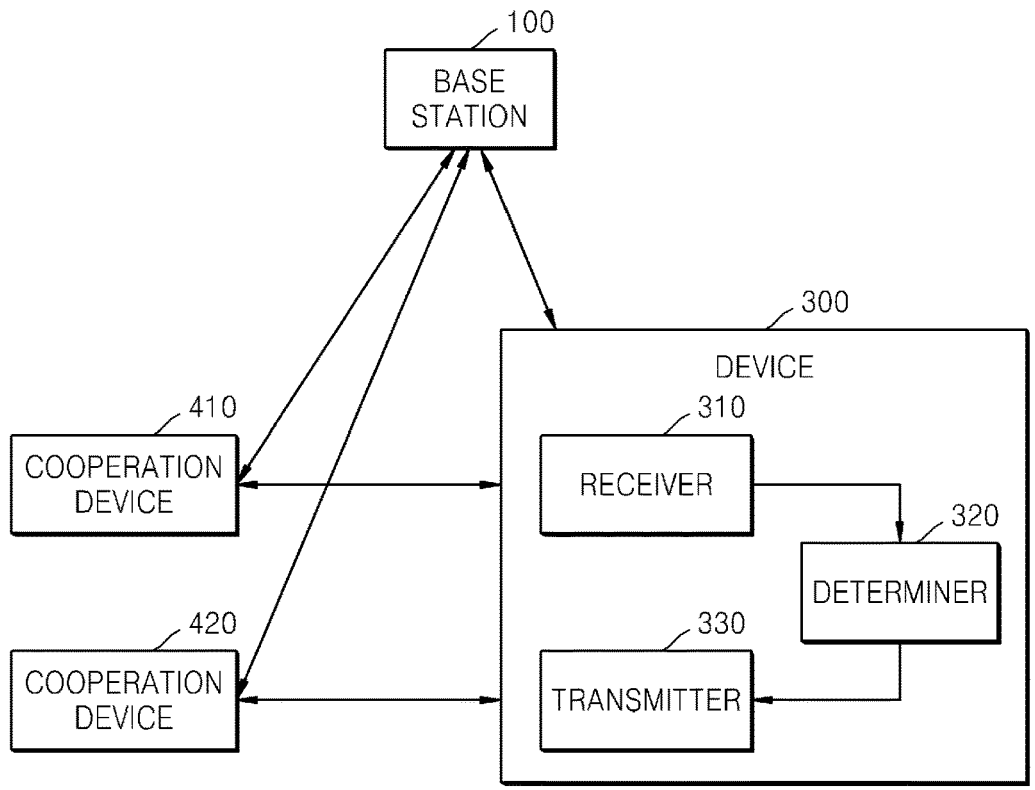
FIG. 3 is a diagram for describing a device according to some example embodiments of the present inventive concept.

FIG. 3 is a diagram for describing a device 300 according to some example embodiments of the present inventive concept. Referring to FIG. 3, the device 300 includes a receiver 310, a determiner 320, and a transmitter 330.

The receiver 310 receives data from the base station 100 or cooperation devices 410 and 420. The receiver 310 receives split data from the base station, and receives remaining data from any one of the cooperation devices 410 and 420.

The receiver 310 receives a message about a total transmission rate from the base station 100. The total transmission rate indicates transmission efficiency or a transmission rate provided from the base station 100 when the device 300 forms a cooperation pair with any one of the cooperation devices 410 and 420. In other words, the total transmission rate indicates a transmission rate allocable to two devices forming a cooperation pair when the device 300 forms a cooperation pair with any one of the cooperation devices 410 and 420. The transmission rate indicates allocable resources. For example, when resources allocable to a cooperation pair are increased, the total transmission rate is increased. The allocable resources may indicate an allocable frequency band. The receiver 310 outputs the received message about the total transmission rate to the determiner 320.

The receiver 310 receives messages about transmission rates providable by the cooperation devices 410 and 420 capable of D2D communications in a radio communication system supporting D2D communications. The cooperation devices 410 and 420 denote devices capable of D2D communications with the device 300. For example, the cooperation devices 410 and 420 may be radio devices capable of communicating with the device 300 by being disposed adjacent to the device 300. The device 300 receives messages about transmission rates providable by the cooperation devices 410 and 420 from each of the cooperation devices 410 and 420. In other words, the cooperation devices 410 and 420 calculate transmission rates providable to the device 300 from among the total transmission rate, and transmit messages about the calculated transmission rates to the device 300.

The receiver 310 may be a device component for transmitting or receiving electromagnetic waves in radio communication, such as an antenna.

The receiver 310 receives split data from a device forming a cooperation pair with the device 300. When the cooperation pair is determined, two devices forming the cooperation pair receive split data from the base station 100 by using MIMO technology. The receiver 310 receives a part of the split data from the base station 100, and receives a remaining part of the split data from the device forming the cooperation pair.

The determiner 320 determines transmission rates that it suggests to the cooperation devices 410 and 420 based on the transmission rates providable by the cooperation devices 410 and 420. The determiner 320 receives the transmission rates providable by the cooperation devices 410 and 420 from the receiver 310.

The determiner 320 changes the transmission rates suggested and providable to the cooperation devices 410 and 420 until the transmission rates providable by the cooperation devices 410 and 420 converge, and determines a final transmission rate based on the converged transmission rates (transmission rates suggested or providable to the cooperation devices 410 and 420). The converging of the transmission rates means that transmission rates received by the device 300 from the cooperation devices 410 and 420 are the same as transmission rates that the device 300 previously received from the cooperation devices 410 and 420. Alternatively, the converging means that transmission rates transmitted from the device 300 to the cooperation devices 410 and 420 are constant. In other words, once messages about transmission rates are exchanged between the device 300 and the cooperation devices 410 and 420, values of the transmission rates included in the messages no longer change. When the values of the transmission rates no longer change, the determiner 320 determines that the transmission rates have converged, and determines the final transmission rate. The final transmission rate denotes a transmission rate guaranteed in the device 300 when the device 300 communicates via MIMO technology with any one of the cooperation devices 410 and 420. In other words, the device 300 determines one of the cooperation devices 410 and 420 as a cooperation pair, i.e., the device 300 pairs with one of the cooperation devices 410 and 420. The final transmission rate denotes a transmission rate when the device 300 receives data from the base station 100 while communicating via MIMO technology with the determined cooperation device.

The determiner 320 determines a highest transmission rate from among the transmission rates providable by the cooperation devices 410 and 420 as the final transmission rate suggested to the cooperation devices 410 and 420. When the transmission rates providable by the cooperation devices 410 and 420 converge, the determiner 320 determines the highest transmission rate from among the transmission rates providable by the cooperation devices 410 and 420. Then, the determiner 320 determines the highest transmission rate as the final transmission rate.

The determiner 320 determines a cooperation device capable of providing the highest transmission rate as a cooperation pair, i.e., as a cooperation device for the device 300 to form a cooperation pair with. When the transmission rates providable by the cooperation devices 410 and 420 are converged, the determiner 320 determines the cooperation device capable of providing the highest transmission rate from among the cooperation devices 410 and 420. The determiner 320 forms the cooperation pair with the determined cooperation device. After the cooperation pair is formed, devices forming the cooperation pair determine transmission rates for transmitting and receiving data to and from the base station 100 based on the converged transmission rates. In other words, the devices forming the cooperation pair receive split data based on the transmission rates determined to the devices while receiving the split data from the base station 100. The devices forming the cooperation pair operate as one virtual device having two transmitters. Accordingly, the devices forming the cooperation pair may communicate via MIMO technology with the base station 100, as one virtual device.

The transmitter 330 receives the final transmission rate from the determiner 320 to transmit the final transmission rate to the base station 100. The final transmission rate denotes a transmission rate between the base station 100 and each device.

The transmitter 330 receives information from the determiner 320 about which cooperation device formed the cooperation pair with the device 300, and transmits the information to the base station 100. In other words, the transmitter 330 transmits information to the base station 100 about which one of the cooperation devices 410 and 420 is to form a cooperation pair with the device 300.

The transmitter 330 transmits the split data to the device forming the cooperation pair. The device 300 receives the split data from the base station 100, and the transmitter 330 transmits the received split data to the device forming the cooperation pair.

The base station 100 transmits the split data to each of devices forming a cooperation pair. The base station 100 receives information from the device 300 about which devices have formed a cooperation pair and about determined transmission rates of the devices forming the cooperation pair. The base station 100 allocates radio resources to the devices forming the cooperation pair based on the determined transmission rates. The base station 100 uses the allocated radio resources to transmit split data to the devices. In other words, the base station 100 splits one piece of data into two pieces of split data, and transmits the two pieces of split data respectively to the devices.

Figure 4:
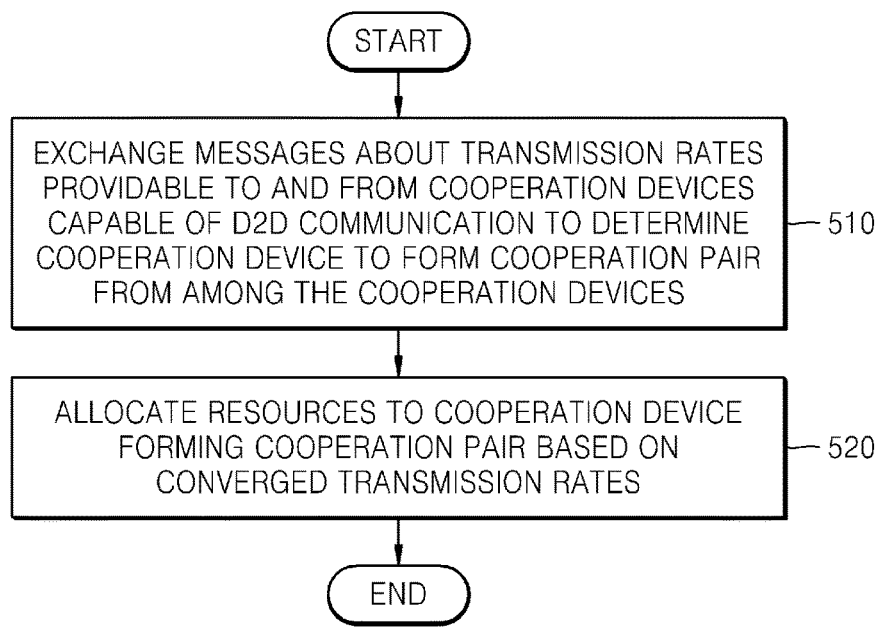
FIG. 4 is a flowchart illustrating a method of allocating resources, according to some example embodiments of the present inventive concept.

FIG. 4 is a flowchart illustrating a method of allocating resources, according to some example embodiments of the present inventive concept. FIG. 4 is a flowchart for describing allocating of resources as performed by the device 300 of FIG. 3. Accordingly, details about the device 300 described above are also applied to the method of FIG. 4, even if omitted.

In operation 510, the device 300 exchanges messages about transmission rates providable to and from cooperation devices capable of D2D communications until the transmission rates converge so as to determine a cooperation device with which to form a cooperation pair from among the cooperation devices. The device 300 determines the cooperation device to form the cooperation pair with based on the converged transmission rates.

For example, the cooperation devices capable of D2D communications are devices disposed adjacent to the device 300 and capable of transmitting and receiving data to and from the device 300 via communication, such as WiFi. The device 300 transmits messages about transmission rates providable by the device 300 to the cooperation devices, and the cooperation devices transmit messages about transmission rates providable by the cooperation devices to the device 300. In other words, the device 300 and the cooperation devices exchange messages about providable transmission rates.

The device 300 and the cooperation devices exchange the messages about the providable transmission rates until values of the providable transmission rates no longer change. In other words, the device 300 and the cooperation devices exchange the messages until recent values of providable transmission rates are equal to values of the next providable transmission rates to be transmitted.

In operation 520, the device 300 allocates resources to the cooperation pair based on the converged transmission rates. The device 300 determines a cooperation device having a highest providable transmission rate as the cooperation device with which to form the cooperation pair. The device 300 allocates resources to the cooperation device forming the cooperation pair with the device 300, based on the transmission rate providable to the cooperation device forming the cooperation pair with the device 300.

Figure 5:
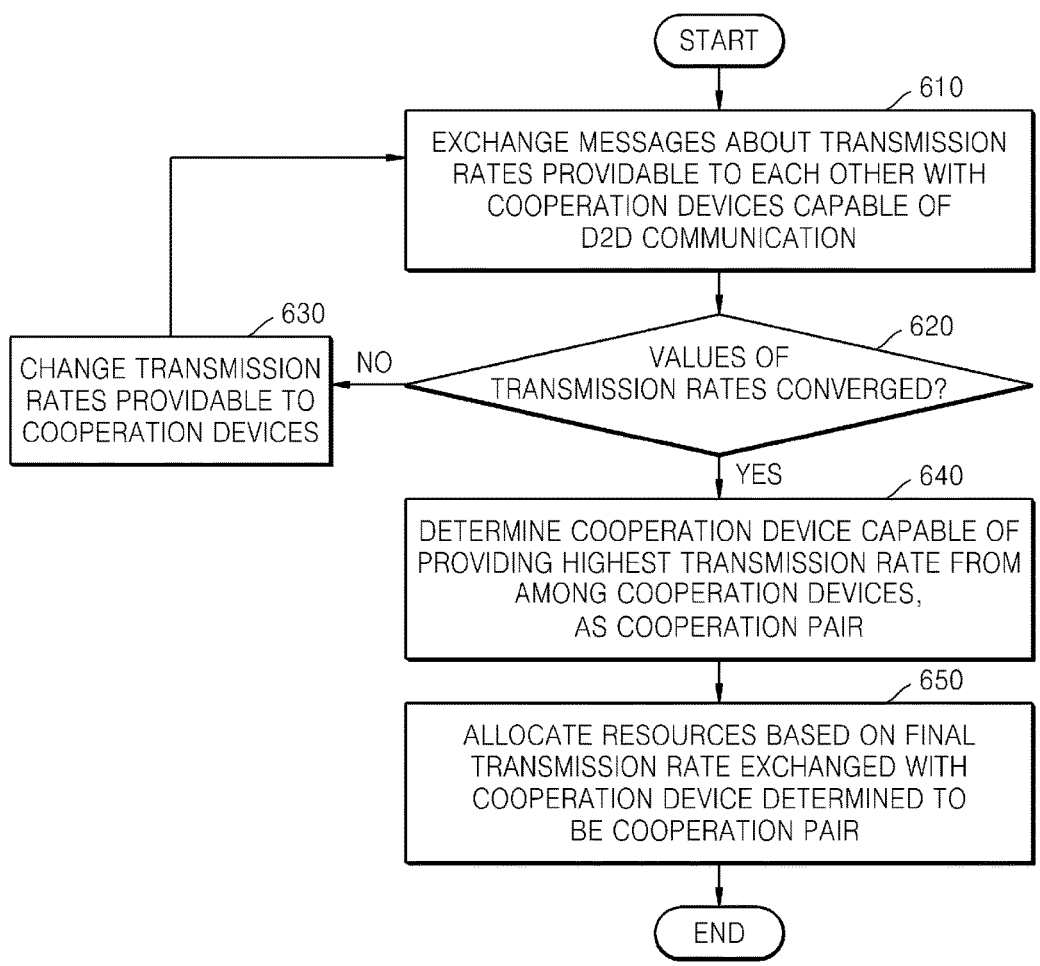
FIG. 5 is a flowchart illustrating a method of allocating resources, according to some example embodiments of the present inventive concept.

FIG. 5 is a flowchart illustrating a method of allocating resources, according to some example embodiments of the present inventive concept. FIG. 5 is a flowchart for describing allocating of resources performed by the device 300 of FIG. 3. Accordingly, details about the device 300 described above are also applied to the method of FIG. 5, even if omitted.

In operation 610, the device 300 exchanges messages about transmission rates providable to each other with cooperation devices capable of D2D communications.

In operation 620, the device 300 determines whether values of the transmission rates have converged. If the values have converged, operation 640 is performed, and if not, operation 630 is performed.

In operation 630, the device 300 changes the transmission rates providable to the cooperation devices. The changed transmission rates are again transmitted to the cooperation devices via exchanged messages in operation 610.

In operation 640, the device 300 determines a cooperation device capable of providing a highest transmission rate from among the cooperation devices as a cooperation device with which to form a cooperation pair. In other words, the device 300 receives a plurality of messages about the transmission rates from the cooperation devices. Then, the device 300 determines a message about a highest transmission rate from among the plurality of messages. The device 300 determines a cooperation device that transmitted the determined message as a cooperation pair.

In operation 650, the device 300 allocates resources based on a final transmission rate exchanged with the cooperation device determined to be the cooperation pair. Radio resources used to transmit data from the base station 100 to the device 300 and the cooperation device determined to be the cooperation pair are allocated based on the final transmission rate. In other words, the radio resources between the base station 100 and the device 300 are determined according to a transmission rate providable from the cooperation device determined to be the cooperation pair to the device 300. In other words, radio resources for guaranteeing a determined transmission rate are allocated to the device 300. Radio resources for guaranteeing a transmission rate providable by the device 300 are also allocated to the cooperation device determined to be the cooperation pair.

Total radio resources allocated to the device 300 and the cooperation device determined to be the cooperation pair are received from the base station 100. In other words, the device 300 pre-receives a total transmission rate between the base station 100 and the cooperation pair, which is provided when the device 300 forms the cooperation pair with the cooperation device. The total transmission rate differs based on which cooperation device forms the cooperation pair with the device 300.

Figure 6:
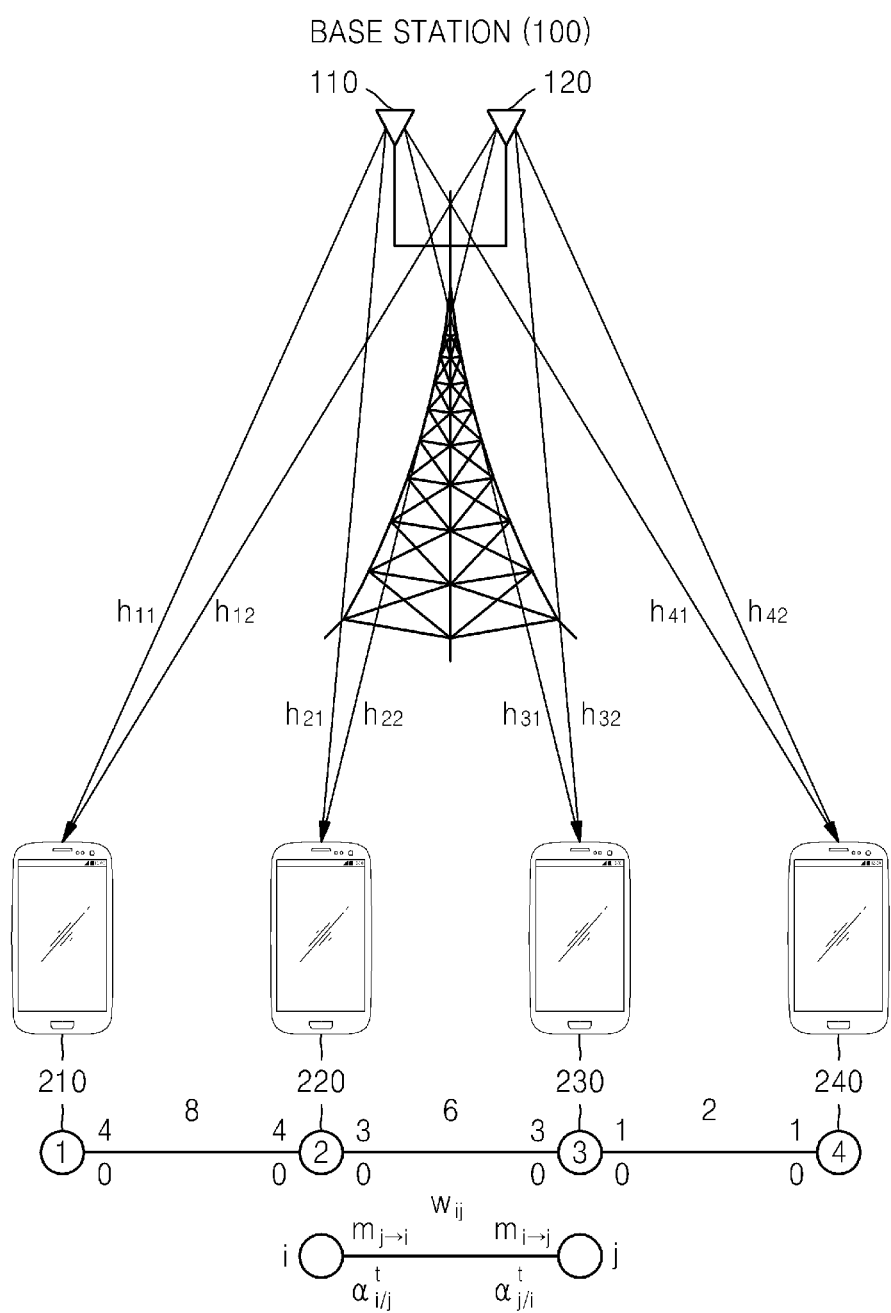
FIG. 6 is a diagram for describing a method of allocating resources, according to some example embodiments of the present inventive concept.

FIG. 6 is a diagram for describing a method of allocating resources, according to some example embodiments of the present inventive concept. In FIG. 6, the base station 100 includes the first through fourth devices 210 through 240. Also in FIG. 6, the first through fourth devices 210 through 240 are indicated as circles that are connected to each other by lines.

Devices connected in a line denote that they are capable of D2D communications. For example, the first device 210 is capable of D2D communications with the second device 220, and the second device 220 is capable of D2D communications with the first and third devices 210 and 230.

Referring to signs in FIG. 6, ' ' and 'j' are indexes for classifying devices. $w_{ij}$ denotes a total transmission rate guaranteed when the base station communicates with devices forming a cooperation pair, when a device$_i$ and a device$_j$ form a cooperation pair. $m_{j \to i}$ denotes a message about a transmission rate providable from the device$_j$ to the device$_i$. $\alpha^t_{i/j}$ denotes a message about a transmission rate suggested from the device$_i$ to the device$_j$. Here, t denotes a number of times a message is transmitted or a time taken to transmit a message. For example, $w_{12}$ denotes a total transmission rate guaranteed when the first and second devices 210 and 220 forming a cooperation pair communicate with the base station 100. $m_{2 \to 1}$ denotes a message about a transmission rate providable by the second device 220 to the first device 210. $a^2_{3/1}$ denotes a message about a second transmission rate suggested by the third device 230 to the first device 210.

Figure 7:
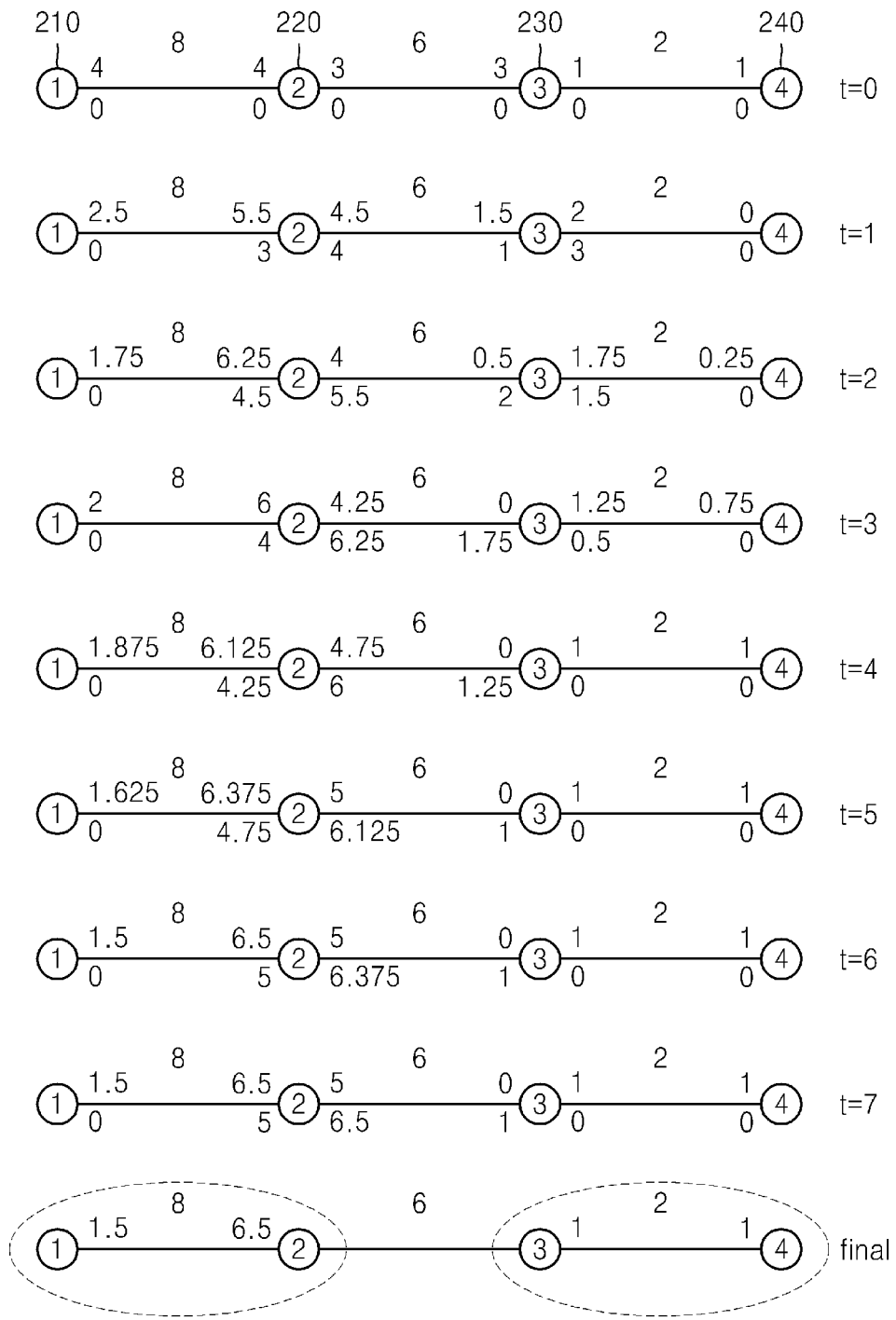
FIG. 7 is a diagram for describing a method of allocating resources, according to some example embodiments of the present inventive concept.

For convenience of description, in FIGS. 6 and 7, transmission rates are indicated by only indicating numbers on lines. $w_{ij}$ is indicated above a center of a line. $m_{j \to i}$ is indicated above a left side of the line, and $m_{j \to i}$ is indicated above a right side of the line. $a^t_{i/j}$ is indicated below the left side of the line, and $a^t_{j/i}$ is indicated below the right side of the line.

Messages about transmission rates transferred between the first through fourth devices 210 through 240 will now be described with reference to FIG. 6. In FIG. 6, the first device 210 is capable of D2D communications with the second device 220. Accordingly, D2D communications is not possible if the first device 210 does not form a cooperation pair with the second device 220. The second device 220 is capable of D2D communications with the first and third devices 210 and 230. Accordingly, the second device 220 exchanges messages about transmission rates with the first and third devices 210 and 230 so as to form a cooperation pair with a device providing a higher transmission rate from among the first and third devices 210 and 230. The third device 230 is capable of D2D communications with the second and fourth devices 220 and 240. The fourth device 240 is capable of D2D communications with the third device 230.

Numbers shown in FIGS. 6 and 7 show sizes of transmission rates, wherein units of transmission rates may be in any form, such as bits per second (bps), kilobits per second (kbps), or Hertz (Hz) or cycles per second. In FIGS. 6 and 7, only numbers are shown for convenience of description.

FIG. 7 is a diagram for describing a method of allocating resources, according to some example embodiments of the present inventive concept. Referring to FIG. 7, dealings of transmission rates between the first through fourth devices 210 through 240 are illustrated. In other words, the first through fourth devices 210 through 240 make a deal to determine which transmission rates they will provide to one another, through bidding of transmission rates. In FIG. 7, transmission rates are converged through 9 operations from t=0 to final.

The first through fourth devices 210 through 240 each calculate transmission rates providable to corresponding cooperation devices and suggested to the corresponding cooperation devices. A cooperation device denotes a device capable of D2D communications with a corresponding device. For example, a cooperation device of the first device 210 is the second device 220, and cooperation devices of the second device 220 are the first and third devices 210 and 230.

An example of a method of a device calculating transmission rates providable to cooperation devices will now be described. The first through fourth devices 210 through 240 calculate transmission rates providable to cooperation devices by using Equation 1 below.

$$m_{i \to j}^t = (w_{ij} - a_{i/j}^t)_+ - \frac{1}{2}(w_{ij} - a_{i/j}^t - a_{j/i}^t)_+ \quad \text{[Equation 1]}$$

In Equation 1, + next to a set of brackets denotes a positive value when a value inside that set of brackets is positive, and a function having 0 when the value inside that set of brackets is lower than 0. Equation 1 is used to calculate a transmission rate providable by the device$_i$ to the device$_j$. When the device$_i$ forms a cooperation pair with the device$_j$, a transmission rate ($m_{i \to j}^t$) suggested to the device$_j$ is calculated based on a total transmission rate ($w_{ij}$), a transmission rate ($a_{i/j}^t$) suggested by the device$_i$ to the device$_j$, and the transmission rate ($a_{j/i}^t$) suggested by the device$_j$ to the device$_i$.

An example of a method of a device calculating transmission rates suggested to cooperation devices will now be described. The first through fourth devices 210 through 240 calculate transmission rates suggested to cooperation devices by using Equation 2 below.

$$a_{i \to j}^{t+1} = s \cdot \max_{k \in N(i)/j}(m_{k \to i}^t) \text{ or } (1-s)a_{i \to j}^t + s \cdot \max_{k \in N(i)/j}(m_{k \to i}^t) \quad \text{[Equation 2]}$$

In Equation 2, max denotes a function for selecting a highest value from among values of $m_{k \to i}^t$. 't+1' may denote an operation higher than t by 1, or that it is calculated temporally after t. N(i)/j denotes remaining cooperation devices obtained after excluding the device$_j$ from among cooperation devices of the device$_i$. In other words, N(i)/j denotes cooperation devices excluding the device while the device$_i$ calculates $a_{i \to j}^{t+1}$ to be transmitted to the device$_j$. For example, when the second device 220 calculates $a_{2 \to 3}^{t+1}$, N(2)/3 is the first device 210. 's' is a value for adjusting a scale, as desired by a user (and may or may not be predetermined).

The device$_i$ selects a value of a highest transmission rate in messages ($m_{k \to i}^t$) transmitted from cooperation devices to the device$_i$, and calculates transmission rates ($a_{i \to j}^{t+1}$) suggested by the device$_i$ to the cooperation devices.

When exchanged transmission rates converge, the device 300 determines a final transmission rate according to Equation 3 below.

$$r_i = \max_{k \in N(i)}(m_{k \to i}^t) \quad \text{[Equation 3]}$$

The device 300 determines a highest transmission rate, from among providable transmission rates received from cooperation devices, as a final transmission rate. $r_i$ denotes a final transmission rate determined by the device$_i$.

Dealing of transmission rates as four devices exchange messages will now be described with reference to FIG. 7.

A total transmission rate when devices form a cooperation pair will now be described. A total transmission rate of the first and second devices 210 and 220 is 8, and a total transmission rate of the second and third devices 220 and 230 is 6. A total transmission rate of the third and fourth devices 230 and 240 is 2.

At t=0, the first through fourth devices 210 through 240 exchange messages about transmission rates providable to each other and messages about transmission rates suggested to each other. For example, a transmission rate providable to the first device 210 by the second device 220 is 4, and a transmission rate providable to the third device 230 by the second device 220 is 3. A transmission rate providable to the second device 220 by the first device 210 is 4, and a transmission rate providable to the second device 220 by the third device 230 is 3. At t=0, transmission rates suggested by the first through fourth devices 210 through 240 are 0.

At t=1, the first through fourth devices 210 through 240 exchange messages about transmission rates providable to each other and suggested to each other based on the messages exchanged at t=0. Based on the second device 220, the second device 220 calculates $m_{2 \to 1}^1$ (=$(8-3)_+ - 0.5*(8-3-0)$=2.5) providable to the first device 210 according to Equation 1. Also, the second device 220 calculates $m_{2 \to 3}^1$ (=$(6-4)_+ - 0.5*(6-4-1)$=1.5) providable to the third device 230 according to Equation 1.

Also, since the second device 220 suggests one of received $m_{1 \to 2}^0$ and $m_{3 \to 2}^0$ to the first device 210 while calculating $a_{2 \to 1}^1$ suggested to the first device 210 according to Equation 2, the second device 220 suggests $m_{3 \to 2}^0$ excluding $m_{1 \to 2}^0$ received from the first device 210, to the first device 210. In this case, since only $m_{3 \to 2}^0$ received from the third device 230 is left when $m_{1 \to 2}^0$ received from the first device 210 is excluded, the second device 220 suggests $m_{3 \to 2}^0$ to be $a_{2 \to 1}^1$ to the first device 210. If $m_{3 \to 2}^0$, $m_{4 \to 2}^0$, etc. are received from a plurality of devices excluding $m_{1 \to 2}^0$ received from the first device 210, the second device 220 selects a highest value from among $m_{3 \to 2}^0$, $m_{4 \to 2}^0$, etc. to be suggested to the first device 210. Here, s=1.

At t=2 through t=7 and final, the first through fourth devices 210 through 240 exchange messages about transmission rates based on Equations 1 and 2 as described above. Here, at t=7 and final, values of transmission rates that are exchanged are not changed. In this case, the first through fourth devices 210 through 240 determine that transmission rates have converged, and determine final transmission rates and cooperation pairs. In FIG. 7, the first and second devices 210 and 220 form a cooperation pair and the third and fourth devices 230 and 240 form a cooperation pair.

For example, in the second device 220, since the first device 210 is capable of providing a transmission rate of 6.5 and the third device 230 is capable of providing a transmission rate of 5, the first device 210 is determined as a cooperation pair. Also, the first and second devices 210 and 220 allocate resources based on transmission rates of 1.5 and 6.5, which are final transmission rates. Information about the allocated resources is transmitted to the base station 100.

If two devices form a cooperation pair, a relationship of $r_i+r_j=w_{ij}$ is established, and if not, a relationship of $r_i+r_j \geq w_{ij}$ is established. If two devices form a cooperation pair and surplus transmission rates remaining after achieving all transmission rates of data individually expected by the two devices are the same, a condition of Equation 4 below is achieved.

$$r_i - \max_{k \in N(i)/j}(w_{ik}-r_k)_+ = r_j - \max_{l \in N(j)/i}(w_{jl}-r_l)_+ \qquad \text{[Equation 4]}$$

If the surplus transmission rates are not the same, a relationship of Equation 5 is achieved according to $p_{ij}$ and $p_{ji}$ indicating ratios thereof.

$$\frac{1}{p_{ij}}\{r_i - \max_{k \in N(i)/j}(w_{ik}-r_k)_+\} = \frac{1}{p_{ji}}\{r_j - \max_{l \in N(j)/i}(w_{jl}-r_l)_+\} \qquad \text{[Equation 5]}$$

Also, if the surplus transmission rates are not the same, the device 300 calculates a transmission rate providable to a cooperation device according to Equation 6 below.

$$m_{i \to j}{}^t = (w_{ij}-a_{ij}{}^t)_+ - p_{ij}(w_{ij}-a_{ij}{}^t-a_{ji}{}^t)_+ \qquad \text{[Equation 6]}$$

Devices in a network determine a cooperation pair for D2D communications by using the above method. Also, devices forming a cooperation pair communicate via MIMO technology with a base station according to determined final transmission rates, and thus individual devices may allocate resources regardless of a base station. In addition, a transmission rate throughout a network may be increased by using a method according to some example embodiments of the present inventive concept compared to a method of determining a transmission rate after determining a cooperation pair for transferring resources between all devices in a network.

As described above, according to some example embodiments of the present inventive concept, a cooperation pair of devices for obtaining most efficient transmission rates in a network can be determined.

By determining the cooperation pair based on messages transferred between the devices, the cooperation pair can be determined regardless of a base station.

Some example embodiments of the present inventive concept can be written as computer programs and can be implemented in general-use digital computers that execute the programs using a computer readable recording medium. Examples of the computer readable recording medium include magnetic storage media (e.g., read-only memory (ROM), floppy disks, hard disks, etc.), optical recording media (e.g., compact disc read-only memories (CD-ROMs), or digital video discs (DVDs)), etc.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A device, comprising:
   a receiver configured to receive, from cooperation devices, messages about first transmission rates provided by the cooperation devices configured for device-to-device (D2D) communications in a radio communication system supporting the D2D communications, wherein the cooperation devices are devices with which the device can form a cooperation pair, for receiving split data from a base station, and wherein the first transmission rates are rates that the cooperation devices are able to provide for transmitting part of the split data from the base station to the device;
   a determiner configured to determine second transmission rates for the device to suggest to the cooperation devices based on the first transmission rates, wherein the second transmission rates are rates that the cooperation devices are suggested to provide for transmitting part of the split data from the base station to the device; and
   a transmitter configured to transmit messages about the second transmission rates to the cooperation devices;
   wherein the determiner is further configured to change the second transmission rates until the first transmission rates converge,
   wherein the determiner is further configured to determine a final transmission rate suggested to the cooperation devices based on the converged first transmission rates, and
   wherein the receiver is configured to receive a part of split data from the base station according to the final transmission rate and a remaining part of the split data from one of the cooperation devices according to the final transmission rate.

2. The device of claim 1, wherein the determiner is further configured to determine a highest transmission rate from among the first transmission rates as the final transmission rate suggested to the cooperation devices.

3. The device of claim 1, wherein the determiner is further configured to determine the second transmission rates based on previously determined second transmission rates, and
   wherein the transmitter is further configured to transmit the second transmission rates to the cooperation devices.

4. The device of claim 1, wherein when the first transmission rates converge, the determiner is further configured to determine a cooperation device configured to provide a highest transmission rate as the cooperation pair for the D2D communications.

5. The device of claim 4, wherein the transmitter is further configured to transmit information about the determined cooperation pair and the final transmission rate to the base station.

6. The device of claim 1, wherein the receiver is further configured to receive from the base station a total transmission rate between the base station and cooperation pairs, and
   wherein the total transmission rate is provided when the device forms the cooperation pairs with the cooperation devices.

7. The device of claim 6, wherein the determiner is further configured to determine the second transmission rates within a range of the total transmission rate.

8. The device of claim 1, wherein the receiver is further configured to receive the first transmission rates, and wherein the determiner is further configured to determine the second transmission rates based on the first transmission rates and previously determined second transmission rates.

9. The device of claim 1, wherein the determiner is further configured to distribute surplus transmission rates to the cooperation device, wherein the surplus transmission rates are obtained by excluding the first transmission rates and the second transmission rates from a total transmission rate between a base station and cooperation pairs.

10. A method of allocating resources for communication between a device and a base station in a communication system supporting device-to-device (D2D) communications, the method comprising:

exchanging messages about first transmission rates and messages about second transmission rates with cooperation devices configured for the D2D communications until values of the first transmission rates converge, wherein the cooperation devices are devices with which the device can form a cooperation pair for receiving split data from a base station, wherein the first transmission rates are rates that the cooperation devices are able to provide for transmitting part of the split data from the base station to the device, and wherein the second transmission rates are rates that the cooperation devices are suggested to provide for transmitting part of the split data from the base station to the device; and allocating the resources used to transmit a first part of the split data from the base station to a first cooperation device of the cooperation pair and a second part of the split data from the base station to a second cooperation device of the cooperation pair based on values of the converged first transmission rates, the cooperation devices configured to exchange the first part and the second part of the split data.

11. The method of claim 10, wherein the method further comprises determining a cooperation device that provides a highest transmission rate from among the cooperation devices as the cooperation pair.

12. The method of claim 11, wherein the determining comprises:

determining the second transmission rates based on the first transmission rates; and changing the second transmission rates until values of the second transmission rates converge.

13. The method of claim 11, wherein the allocating comprises allocating the resources corresponding to the converged first transmission rates to the determined cooperation pair.

14. The method of claim 10, wherein the messages about the second transmission rates are determined based on the messages about the first transmission rates received from the cooperation devices.

* * * * *